United States Patent [19]

Takaishi et al.

[11] Patent Number: 4,466,812
[45] Date of Patent: Aug. 21, 1984

[54] ZEOLITE ENCAPSULATING MATERIAL

[75] Inventors: Tetsuo Takaishi, Toyohashi; Keiji Itabashi, Sagamihara; Satoru Morishita, Kodaira; Hisashi Hatotani, Tokyo, all of Japan

[73] Assignee: Toyo Soda Manufacturing Co., Ltd., Shin-nanyo, Japan

[21] Appl. No.: 404,034

[22] Filed: Aug. 2, 1982

Related U.S. Application Data

[63] Continuation of Ser. No. 188,942, Sep. 19, 1980, abandoned.

[30] Foreign Application Priority Data

Apr. 2, 1980 [JP] Japan .................................. 55-41938

[51] Int. Cl.³ .............................................. B01D 53/04
[52] U.S. Cl. .............................................. 55/68; 55/75; 55/389
[58] Field of Search .................. 55/66, 75, 389, 68; 252/301.1 W, 455 Z

[56] References Cited

U.S. PATENT DOCUMENTS 2,882,243  4/1959  Milton ................................ 55/75 X
3,065,054  11/1962  Haden, Jr. et al. ........ 252/455 Z X
3,078,645  2/1963  Milton ..................................... 55/75
3,316,691  5/1967  Sesny et al. ............................. 55/66
3,322,690  5/1967  Bilisoly ........................... 252/455 Z
3,375,065  3/1968  McDaniel et al. .......... 252/455 Z X
3,785,122  1/1974  Yatsurugi et al. ...................... 55/75

OTHER PUBLICATIONS

Breck, Zeolite Molecular Sieves, Structure, Chemistry, and Use, 1974, 490–498, 623–628, and 633–645.
Fraenkel & Shabtai, "Encapsulation of Hydrogen in Molecular Sieve Zeolites", Journal of the American Chemical Society /99:21/, Oct. 12, 1977, pp. 7074–7076.
Meier et al., Molecular Sieves, Advances in Chemistry Series 121, 1973, pp. 87–95.

Primary Examiner—Robert H. Spitzer
Attorney, Agent, or Firm—Armstrong, Nikaido, Marmelstein & Kubovcik

[57] ABSTRACT

A zeolite encapsulating material composed of an A-type zeolite expressed by a typical unit cell $(Cs_xMII_yNa_z)$-$(AlO_2.SiO_2)_{12}$·$(NaAlO_2)\delta$·$\omega H_2O$ wherein MII represents a divalent metal; $0 \leq \delta \leq 1$; and $\omega$ represents a positive number. Further, in the above stated unit cell, x, y and z which respectively represent the numbers of Cs, M and Na within the unit cell are in a relation:

$x + 2y + z = 12$
$3 \leq x < 10$ $0 < y \leq 4.5$.

3 Claims, 5 Drawing Figures

ZEOLITE ENCAPSULATING MATERIAL

This is a continuation of application Ser. No. 188,942, filed Sept. 19, 1980, now abandoned.

BACKGROUND OF THE INVENTION:

This invention relates to an improved zeolite encapsulating material.

Zeolite is one of adsorbents that are at present widely in use for various purposes including industrial purposes. The zeolite, particularly A type zeolite, is typically represented by a sodium-A zeolite, which is expressed by a typical unit cell of $Na_{12}(AlO_2.SiO_2)_{12}\cdot(NaAlO_2)\delta\cdot\omega H_2O$, wherein $0 \leq \delta \leq 1$ and $\omega$ represents a positive number. In this unit cell, 12 sodium ions are ion exchangeable for other metal ions. The effective adsorption pore diameter is determined by the kinds of the exchanged ions and the rate of exchange thereof. However, the size of the effective adsorption pore diameter is in close relation to the crystal structure, the size of the ion species to be exchanged and the site selectivity properties thereof within a unit cell. In other words, among the 12 cations (sodium ions) which are exchangeable within the unit cell of zeolite, three ions are located on the face of an eight-membered oxygen ring where the molecule to be adsorbed comes in and goes out and eight ions are on the face of a six-membered oxygen ring while the remaining one is located on the face of a four-membered oxygen ring.

Therefore, it is the size of the cations on the face of the eight-membered oxygen ring that have an influence directly on the adsorption properties of the zeolite. Where a sodium-A zeolite is employed as starting material and the sodium ions of the zeolite are exchanged for potassium ions, the potassium ions have a preference for entering the sites on the face of the eight-membered oxygen ring. The effective adsorption pore diameter of the sodium-A zeolite is 4 Å. When the potassium ions which are larger than sodium ions enter the sites, the effective adsorption pore diameter of the ion-exchanged zeolite becomes 3 Å.

If the ion exchange is carried out for calcium ions, calcium ions have a preference for entering the sites on the face of the six-membered oxygen ring while, among the sodium ions that are to move out to keep the balance of charges, the sodium ions on the face of the eight-membered oxygen ring have priority over other sodium ions in moving out. Therefore, when an ion-exchange process is carried out until all of the sodium ions disappear from the face of the eight-membered oxygen ring, the effective adsorption pore diameter of the zeolite used in the ion-exchange increases and becomes 5 Å.

Further, if the sodium-A zeolite is ion-exchanged for a cesium ion which is larger than the potassium ion, the cesium ion has a preference to take a site on the face of the eight-membered oxygen ring. Therefore, the effective adsorption pore diameter becomes smaller than 3 Å when three or more than three cesium ions are exchanged per unit cell.

Generally, the effective adsorption pore diameter of zeolite or that of zeolite obtained through ion-exchange is nearly uniform. A molecule smaller than the effective adsorption pore diameter of the zeolite can be adsorbed by the zeolite. However, a molecule larger than that cannot be adsorbed by the zeolite through a normal process.

The site selectivity properties of the ion to be exchanged with the exchangeable ion contained in the zeolite and variation that takes place in adsorption properties with variation in combination of the species of ions have not been clearly known. The present inventors conducted researches into the details of these relations. As a result of these researches, it has been discovered that a zeolite having a novel adsorption property which has hitherto been unknown can be obtained through an ion exchange process for reformation of zeolite in terms of the adsorption properties thereof carried out with the combination of ion species and the rate of exchange suitably selected. In other words, it has been discovered that, in an ion-exchange process where exchangeable sodium ions of a sodium-A zeolite are gradually exchanged for calcium ions, when two or more than two calcium ions enter, sodium ions on the face of the eight-membered oxygen ring move out and this makes the effective adsorption pore diameter 5 Å.

On the other hand, in case where the potassium ions of a potassium-A zeolite, which is obtained by exchanging the exchangeable sodium ions of a sodium-A zeolite with potassium ions, or those of a potassium-A zeolite synthesized with a source of potassium used as raw material, the divalent metal ions have preference to come onto a six-membered oxygen ring face. However, when the number of the divalent metal ions is less than 4.5 per unit cell, the potassium ions on the face of the eight-membered oxygen ring are not removed from there and thus the effective adsorbing pore diameter is kept at 3 Å. Meanwhile, when three or more than three exchangeable sodium ions of a sodium-A zeolite are exchanged for cesium ions and the remainder of sodium ions are exchanged for divalent metal ions, the divalent metal ions have preference to come onto the face of the six-membered oxygen ring and then, with the number of the divalent metal ions less than 4.5 per unit cell, the effective adsorption pore diameter is kept as a value less than 3 Å as determined by the radii of the cesium ions because the cesium ions then stay on the face of the eight-membered oxygen ring.

It has been found that, in the case of a zeolite in which the effective adsorption pore diameter is less than 3 Å with cesium ions on the face of the eight-membered oxygen ring and divalent metal ions on a part of the six-membered oxygen ring face as stated in the foregoing, a molecule of diameter larger than the effective adsorption pore diameter can be adsorbed by the zeolite at a relatively low temperature and at low pressure; and that the adsorbed molecule will not be desorbed even when the zeolite is brought back into ordinary desorbing condition. Namely, the zeolite has an encapsulating properties. This indicates that the cesium ions on the face of the eight-membered oxygen ring are made to be readily movable by the influence of the divalent ions received in exchange. Such a movable state of the cesium ions on the face of the eight-membered oxygen ring is believed to be dependent upon the number of the exchanged divalent metal ions on the face of the six-membered oxygen ring as well as temperature. Therefore, the molecule which is encapsulated in the zeolite can be released from an encapsulated state by raising the temperature of the zeolite. It is also possible that the amount of encapsulated gas and encapsulating and deencapsulating temperature can be controlled by varying the number of the divalent metal ions to be exchanged. In a practical application, the exchangeable cations of the zeolite do not have to be limited to potassium or cesium and divalent metal ions but it is also permissible to have sodium ions on a part of the face of the six-membered oxygen ring.

It has been disclosed by a report appeared in "Journal of the American Chemical Society," Vol. 99, 7074, (1977), Dan Fraenkel and Joseph Shabtai that a cesium-sodium-A zeolite in which exchangeable cations include only cesium and sodium ions is capable of encapsulating hydrogen gas therein.

However, compared with the cesium-sodium-A zeolite, the encapsulating material obtained in accordance with the present invention has greater encapsulating properties and more readily permits encapsulation and deencapsulation. The superiority of the encapsulating material of the invention derives from the fact that the temperature dependency of the thermal vibration of the cesium ions on the face of the eight-membered oxygen ring is increased by the influence of the divalent metal ions received in exchange.

The amplitude of the thermal vibration of the cesium ions on the face of the eight-membered oxygen ring depends not only on the number of the divalent metal ions on the face of the six-membered oxygen ring but also on the temperature condition. Therefore, the molecule encapsulated in the A type zeolite can be deencapsulated by raising the temperature of the zeolite encapsulating the molecule. The radius of the cesium ions is relatively large. Therefore, the gas encapsulating capacity can be increased by minimizing the number of the cesium ions allowed to be on the face of the six-membered oxygen ring besides the three on the face of the eight-membered oxygen ring.

SUMMARY OF THE INVENTION

It is a general object of the invention to provide the above stated zeolite encapsulating material which is manufactured in the following manner: The sodium-A zeolite which is to be used for ion-exchange is obtained by an ordinary known method, for example, by a hydrothermal crystallizing process with sources of silica, alumina and sodium employed. Further, the ion-exchange between the sodium ions of the sodium-A zeolite and the cesium ions is carried out in accordance with an ordinary known method by immersing the sodium-A zeolite in a solution containing the cesium ions. The ratio of the ion-exchange between the sodium ions and the cesium ions is approximately set by allowing at least three cesium ions to be present per unit cell of the zeolite. It is also possible to use a cesium-A zeolite which is obtained by using a source of cesium from the beginning without having recourse to ion-exchange. The cesium-A zeolite thus obtained is subjected to ion-exchange for divalent metal ions. The divalent metal ions usable in accordance with the present invention are selected out of a group consisting of the divalent ions of metals belonging to the second group shown in the periodic table such as magnesium, calcium, strontium, zinc, cadmium and mercury; and the divalent ions of transition metals such as manganese, cobalt and iron. The ion-exchange between the cesium-sodium-A zeolite and the above stated divalent metal ions is carried out in an ordinary known method by immersing the cesium-sodium-A zeolite in a solution containing these divalent metal ions.

The composition of a zeolite which is obtained by having a part of the sodium ions contained in a sodium-A zeolite exchanged for cesium ions and by having it further ion-exchanged for the divalent metal ions is as shown below:

$$(Cs_xM_yNa_z)(AlO_2 \cdot SiO_2)_{12} \cdot (NaAlO_2)_\delta \cdot \omega H_2O$$

wherein M represents the divalent metal; $0 \leq \delta \leq 1$; and $\omega$ represents a positive number. In the present invention, the y which represents in the above unit cell the number of the divalent metal ions contained per the unit cell of the zeolite is a factor which governs the properties of the zeolite as an occluding material. In accordance with the invention, x, y and z shown in the above unit cell are in the following relation:

$$x + 2y + z = 12,\ 3 \leq x < 10,\ 0 < y \leq 4.5.$$

The invention is not limited to the method and the order of effecting ion-exchange for the divalent metal ions and for cesium ion with the sodium-A zeolite. In addition to this method, it is also possible either to carry out the two processes of ion-exchange simultaneously by using a solution containing the cesium ions and the divalent metal ions or to carry out the ion-exhange for the cesium ions after carrying out the exchange for the divalent metal ions. For the ion-exchange, an aqueous solution of a metal halide (particularly chloride), nitrate, sulfate and hydroxide is employed and the concentration thereof is suitably determined according to the amount of the zeolite to be used for the exchange, the purpose, the rate of exchange, etc.

To ensure the uniformity and reproducibility of properties of the zeolite encapsulating material obtained in accordance with the invention, it is preferable that ion-exchange equilibrium is thoroughly reached in effecting the ion-exchange. Although the ion-exchange can be effected at a normal temperature, the exchange process is preferably carried out at a temperature around 80° C. for a period of at least 0.5 hour. The zeolite which has undergone the process of ion-exchange for the divalent metal ions is dried by an ordinary known method to make it into a product. The invention is applicable to a wide range of purposes. For example, with the invented zeolite allowed to have a gas encapsulated therein under a relatively low pressure, the gas will not be deencapsulated even when the pressure is brought back to a normal level. Therefore, the gas can be filled at low pressure obviating the necessity of the use of a pressure resistive container, so that the weight of the container can be reduced to facilitate storage and transportation of gas. Particularly, a gas such as radioactive krypton (molecular dia. 4 Å) not only can be handled without difficulty but also the weight thereof can be reduced to a great extent. Further, with the invented zeolite employed, argon, the molecule diameter of which is 3.8 Å can be encapsulated in the same manner as krypton, so that the zeolite is usable also as argon encapsulating material. Further, since oxygen the molecule dia. of which is 2.8 Å cannot be encapsulated, argon can be separated from an argon-oxygen mixture gas and can be solely encapsulated in the zeolite.

Since the encapsulating material of this invention is capable of encapsulating not only hydrogen gas but also other gases such as helium gas and acetylene gas, it is usable also for storing them.

The above and further objects, features and advantages of the invention will become apparent from the following detailed description of embodiment examples thereof taken in connection with the accompanying drawings.

DETAILED DESCRIPTION OF PREFERRED EMBODIMENTS

EXAMPLE 1

A sodium-A zeolite powder (manufactured by Toyo Soda Manufacturing Co., Ltd.) was allowed to adsorb water content in saturating amount. The, 26 g of the zeolite powder was put in 329 ml of an aqueous solution of 0.2 normal manganese chloride. They were brought into contact with each other with stirring at 80° C. over a period of 20 hours. Solid-liquid separation was effected by filtration. A solid component thus separated was washed with distilled water. After washing, the solid was dried and hydrated to obtain hydrated manganese-sodium-A zeolite. After that, 13 g of the hydrated manganese-sodium-A zeolite was put in 132 ml of an aqueous solution of 1 normal cesium chloride. They were brought into contact with each other with stirring at 80° C. over a period of 20 hours. A solid component was separated from liquid by filtration and washed with distilled water. The washed solid was dried and hydrated to obtain an A type zeolite. The zeolite product thus obtained was subjected to chemical analysis to find that the product was of composition expressed by (Cs4.5 Mn2.6 Na2.3)-A, wherein A represents the framework of the A-type zeolite which remains unchanged through ion-exchange. (The framework of zeolite hereinafter will be expressed in the same manner for subsequent embodiment examples.)

Figure 1:
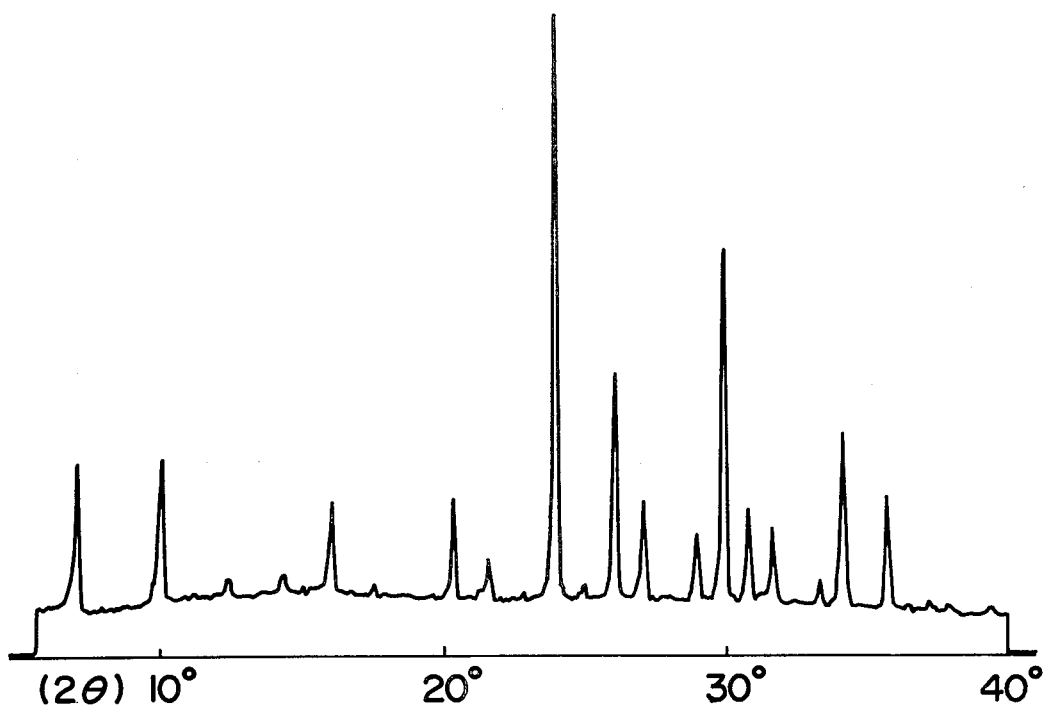
FIG. 1-4 are X-ray diffraction graphs of ion-exchange zeolites obtained in accordance with the embodiment examples 1, 5, 6 and 7.

FIG. 1 shows an X-ray (Cu - K$\alpha$) diffraction graph of a sample thus obtained as in a hydrated state thereof.

EXAMPLE 2

Without adding any binder, the hydrated sample, (Cs4.5 Mn2.6 Na2.3)-A, obtained in Example 1 was compression molded (10 mm$\phi$ × 10 mm) and put in an autoclave of capacity 20 ml in amount of 2 g. While keeping the inside of the autoclave in a vacuum state with a vacuum pump, the autoclave was heated up to 150° C. and kept in that state for a period of one hour. After that, the autoclave was further heated up to 300° C. and kept at 300° C. for two hours and then was degassed. After degassing, the autoclave was cooled down to room temperature or thereabout. Then hydrogen gas of 99.99% purity was introduced into the autoclave and the autoclave was again heated. Pressure when the autoclave was heated up to 300° C. was 100 kg/cm$^2$G.

The autoclave was kept at 300° C. for one hour and then heating was stopped to have the autoclave gradually cooled. The period of time required for lowering the temperature of the autoclave from 300° C. down to room temperature was about 12 hours. Pressure at room temperature was 63 kg/cm$^2$G.

The autoclave was then put in a cooling water tank and cooled down to 0° C. Pressure at this time was 62 kg/cm$^2$G. The hydrogen gas corresponding to added pressure was discharged until the pressure reached atmospheric pressure. The valve of the autoclave was opened while the temperature of the autoclave was kept at 0° C. to have the hydrogen gas within the autoclave diffused to the vacuum system the volume of which had been known. Pressure at this time was measured by a mercury manometer to obtain the volume of non-encapsulated hydrogen gas within the system including the autoclave. After that, a heater was attached to the autoclave. The autoclave was thus heated at a temperature raising rate of about 2.5° C./min to have the hydrogen gas which had been encapsulated in the zeolite deencapsulated therefrom.

By measuring pressure with the mercury manometer, the total amount of gas within the system when the autoclave was at each of various temperature values 50°, 100°, 150°, 200°, 250° and 300° C. was obtained. Accordingly, the amount of gas deencapsulated from the zeolite sample placed within the autoclave, i.e. the amount of encapsulated gas, was equal to a value obtained by subtracting the amount of residual non-encapsulated gas before the start of deencapsulation from total gas amount at each of the above stated temperature values. The amount of deencapsulated gas was obtained by making correction in relation to the volume of the sample placed within the autoclave, room temperature, the temperature of the autoclave, etc. The weight of the sample as in its activated state within the autoclave was separately calculated by measuring the amount of adsorbed water content under a hydrated condition. The amount of the deencapsulated gas per unit weight of the sample as in its activated state at each temperature value which was obtained in the above stated manner was as shown in Table 1 below:

TABLE 1

| Deencapsulating temp., °C. | Amount of deencapsulated gas, mlSTP/g |
| --- | --- |
| 0 | 0 |
| 50 | 1.8 |
| 100 | 9.6 |
| 150 | 17.3 |
| 200 | 18.6 |
| 250 | 18.9 |
| 300 | 19.2 |

EXAMPLE 3

The sample used in this embodiment example was the same as the one used in Example 2. Degassing, hydrogen gas introducing and heating processes were carried out in the same manner as in Example 2. Pressure when heating was effected up to 150° C. was 100 kg/cm$^2$G. The sample was kept in this state for one hour. Then, heating was stopped and the sample was gradually cooled. The length of time required for lowering temperature from 150° C. down to room temperature was about 10 hours. Pressure at room temperature was 73 kg/cm$^2$G. After that, the amount of gas deencapsulated from the sample was obtained in accordance with the same method as in Example 2. The results thus obtained were as shown in Table 2 below:

TABLE 2

| Deencapsulating temp., °C. | Amount of deencapsulated gas, mlSTP/g |
| --- | --- |
| 0 | 0 |
| 50 | 2.4 |
| 100 | 11.1 |
| 150 | 18.9 |
| 200 | 19.7 |
| 250 | 19.9 |

TABLE 2-continued

| Deencapsulating temp., °C. | Amount of deencapsulated gas, mlSTP/g |
|---|---|
| 300 | 20.0 |

EXAMPLE 4

Using the same sample as in Example 2, heating was carried out in the same manner as in Example 2. Pressure when heating was effected up to 150° C. was 50 kg/cm$^2$G. The sample was left in that state for one hour. After that, heating was stopped and the sample was gradually cooled. The length of time required for cooling from 150° C. down to room temperature was about 10 hours. Pressure at room temperature was 37 kg/cm$^2$G. After that, the quantity of gas deencapsulated from the sample was obtained in accordance with the same method as in Example 2. The results thus obtained were as shown in Table 3 below:

TABLE 3

| Deencapsulating temp., °C. | Amount of deencapsulated gas, mlSTP/g |
|---|---|
| 0 | 0 |
| 50 | 1.3 |
| 100 | 6.5 |
| 150 | 11.1 |
| 200 | 11.5 |
| 250 | 11.6 |
| 300 | 11.7 |

EXAMPLE 5

Figure 2:
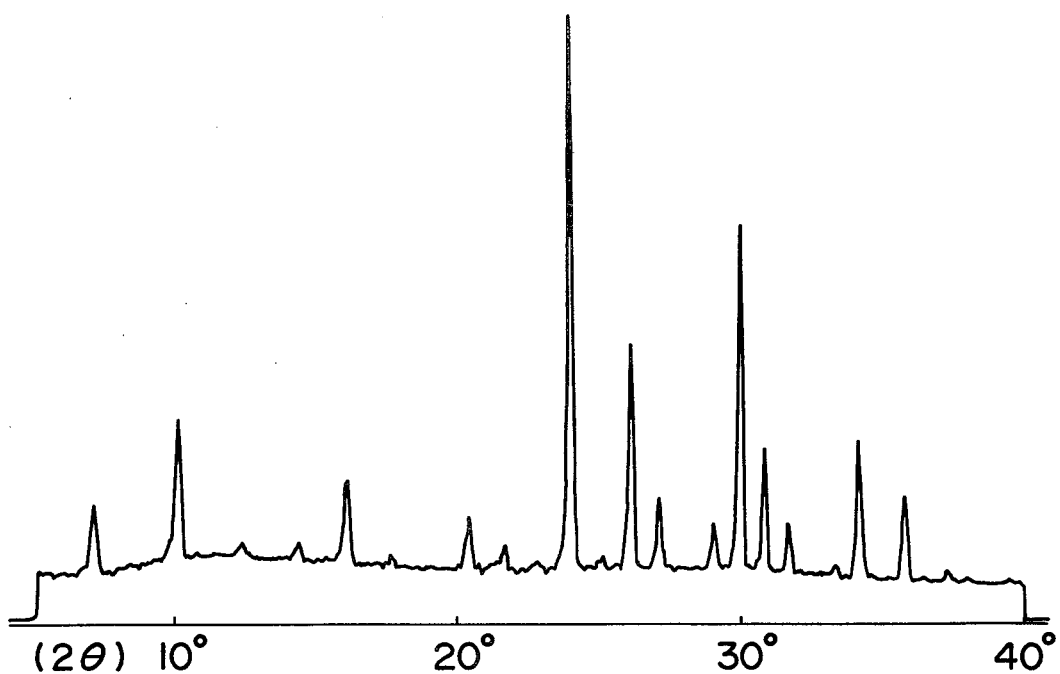

Processes were carried out in a manner similar to Example 1 with the exception that the manganese chloride which was used in Example 1 was replaced with the use of 414 ml of an aqueous solution of 0.2 normal calcium chloride. By this, an ion-exchanged zeolite was obtained. The A type zeolite which was thus obtained ws subjected to chemical analysis to find that the zeolite was of composition expressed by (Cs4.4 Ca3.1 Na1.4)-A. FIG. 2 shows an X-ray (Cu - K$\alpha$) diffraction graph of a sample of this zeolite when it is in a hydrated state.

This hydrated sample was subjected to the same degasing process that was carried out in Example 2 and hydrogen gas was introduced also in the same manner as in Example 2. Pressure when heating was effected up to 300° C. was 100 kg/cm$^2$G. The sample was left in that state for one hour. Then, heating was stopped to gradually cool the sample. The length of time required for lowering the temperature from 300° C. down to room temperature was about 12 hours. Pressure at room temperature was 63 kg/cm$^2$G. After that, the amount of gas deecapsulated from the sample was obtained in accordance with the same method as in Example 2. The results thus obtained were as shown in Table 4 below:

TABLE 4

| Deencapsulating temp., °C. | Amount of deencapsulated gas, mlSTP/g |
|---|---|
| 0 | 0 |
| 50 | 3.4 |
| 100 | 12.9 |
| 150 | 15.8 |
| 200 | 16.1 |
| 250 | 16.4 |
| 300 | 16.7 |

EXAMPLE 6

Figure 3:
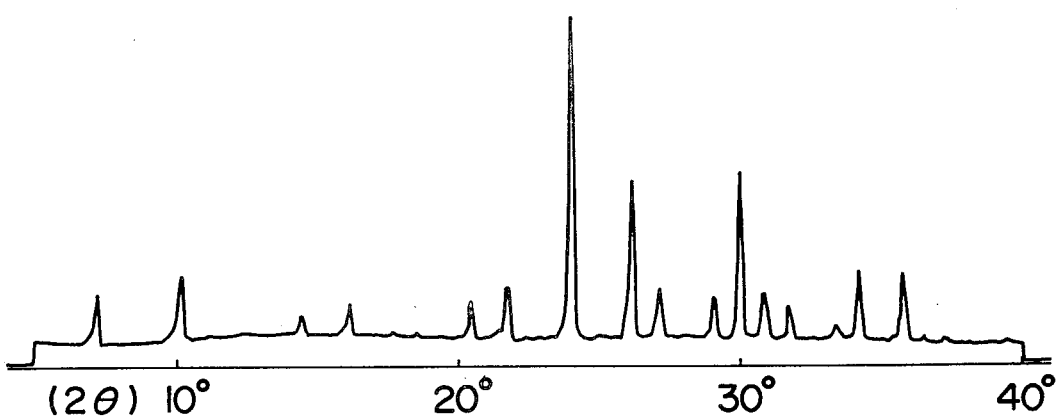

Processes were carried out in a manner similar to Example 1 with the exception that the manganese chloride which was used in Example 1 was replaced with the use of 766 ml of an aqueous solution of 0.1 normal magnesium chloride. By this, an ion-exchanged zeolite was obtained. The A-type zeolite thus obtained was subjected to chemical analysis to find that this zeolite was of composition expressed by (Cs4.4 Mg2.0 Na3.6)-A. FIG. 3 is an X-ray (Cu - K$\alpha$) diffraction graph of a sample of this zeolite when it is in a hydrated state.

The hydrated sample was subjected to the same degasing and hydrogen gas introducing processes that were carried out in Example 2. Pressure when heating was effected up to 300° C. was 100 kg/cm$^2$G. The sample was left in that state for one hour. Then, heating was stopped to gradually cool the sample. The length of time required for lowering the temperature from 300° C. to room temperature was about 12 hours. Pressure at room temperature was 63 kg/cm$^2$G. After that, the amount of gas deencapsulated from the sample was obtained in accordance with the same method as in Example 2. The results thus obtained were as shown in Table 5.

TABLE 5

| Deencapsulating temp., °C. | Amount of deencapsulated gas, mlSTP/g |
|---|---|
| 00 | 0 |
| 50 | 0.8 |
| 100 | 4.9 |
| 150 | 11.5 |
| 200 | 16.0 |
| 250 | 16.9 |
| 300 | 17.3 |

EXAMPLE 7

Figure 4:
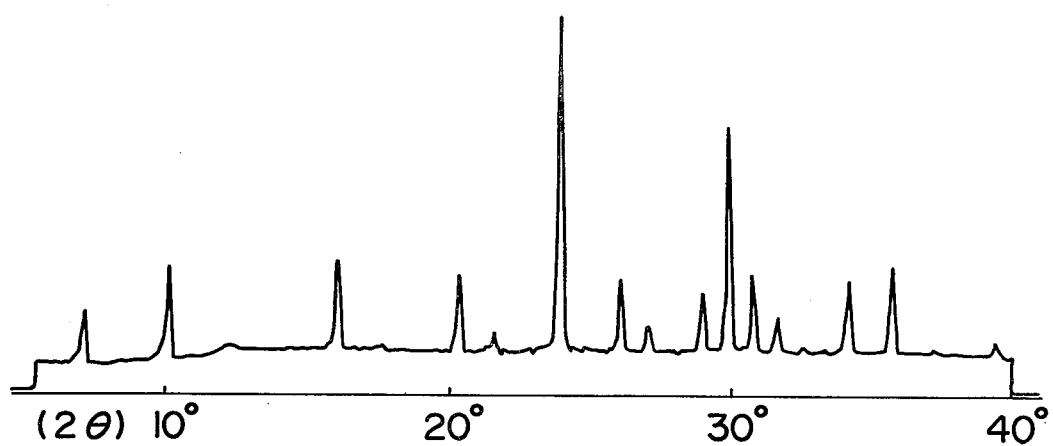

Processes were carried out in a manner similar to Example 1 with the exception that the manganese chloride which was used in Example 1 was replaced with the use of 704 ml of an aqueous solution of 0.1 normal strontium chloride to obtain an ion-exchanged zeolite. The A-type zeolite thus obtained was subjected to chemical analysis to find that this zeolite was of composition expressed by (Cs3.7 Sr3.0 Na2.3)-A FIG. 4 is an X-ray (Cu - K$\alpha$) diffraction graph representing this zeolite as in a hydrated state.

The hydrated sample of this zeolite was subjected to the same degassing process as in Example 2. Then, hydrogen gas of 99.99% purity was introduced into the autoclave. Pressure when heating was effected up to 300° C. was 100 kg/cm$^2$G. The sample was left in that state for one hour. Then, heating was discontinued to let the sample cool gradually. The length of time required for cooling from 300° C. to room temperature was about 12 hours. Pressure at room temperature was 63 kg/cm$^2$G. Following that, the amount of gas deencapsulated from the sample was obtained in accordance with the same method as in Example 2 to obtain results which were as shown in Table 15 below:

TABLE 6

| Deencapsulating temp., °C. | Amount of deencapsulated gas, mlSTP/g |
|---|---|
| 0 | 0 |
| 50 | 4.0 |
| 100 | 13.0 |
| 150 | 15.7 |

TABLE 6-continued

| Deencapsulating temp., °C. | Amount of deencapsulated gas, mlSTP/g |
|---|---|
| 200 | 16.2 |
| 250 | 16.4 |
| 300 | 16.6 |

COMPARISON EXAMPLE 1

Figure 5:
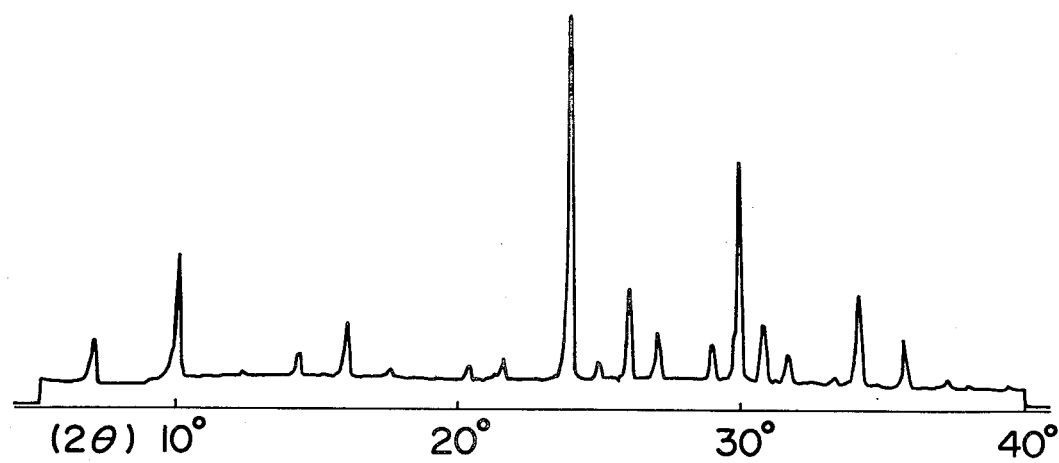
FIG. 5 is an X-ray diffraction graph of an ion-exchange zeolite obtained in accordance with the embodiment example 2 of the invention.

10 g of the same sodium-A zeolite that was used in Example 1 was put in 110 ml of an aqueous solution of 1 normal cesium chloride. They were then brought into contact with each other with stirring at 80° C. over a period of 20 hours. Solid-liquid separation was effected by filtration and a solid component thus separated was washed with distilled water. The washed solid was dried and then was hydrated to obtain an A-type zeolite. Results of chemical analysis indicated that the zeolite was of composition expressed by (Cs4.1 Na7.9)-A. FIG. 5 is an X-ray (Cu - Kα) diffraction graph representing this zeolite as in its hydrated state.

The hydrated sample of this zeolite was subjected to the same degassing process as in Example 2. Then, hydrogen gas was introduced into the autoclave. Pressure when heating was effected up to 300° C. was 100 kg/cm$^2$G. The sample was left in that state for one hour. Then, heating was stopped to let the sample cool gradually. The length of time required for cooling from 300° C. to room temperature was about 12 hours. Pressure at room temperature was 63 kg/cm$^2$G. After that, the amount of gas deencapsulated from the sample was obtained in a manner similar to the method employed in Example 2 to have the results as shown in Table 7 below:

TABLE 7

| Deencapsulating temp., °C. | Amount of deencapsulated gas, mlSTP/g |
|---|---|
| 0 | 0 |
| 50 | 0.2 |
| 100 | 1.2 |
| 150 | 3.5 |
| 200 | 7.0 |
| 250 | 10.7 |
| 300 | 13.5 |

COMPARISON EXAMPLE 2

The hydrated sample (Cs4.1 Na7.9)-A which was obtained in Comparison Example 1 was pressure molded without adding any binder and then was put in an autoclave of capacity 20 ml. The sample was subjected to the same degassing process that was carried out in Example 2. After that, the autoclave was tightly sealed and cooled. Then, the autoclave was put in a cooling water tank to further cool it down to 0° C. Following this, the valve of the autoclave was opened to introduce hydrogen gas of 99.99% purity into the autoclave and then the autoclave was allowed to keep this pressure for a sufficiently long period of time while it is left at 0° C. Then, while the autoclave was still kept at 0° C., the valve was opened to have hydrogen gas corresponding to the added pressure discharged until pressure became atmospheric pressure. The amount of discharged gas was obtained in a manner similar to the method employed in Example 2. The results thus obtained were as shown in Table 8 below:

TABLE 8

| Temperature of the autoclave, °C. | Amount of discharged gas, mlSTP/g) |
|---|---|
| 0 | 0 |
| 50 | 0.2 |
| 100 | 0.4 |
| 150 | 0.5 |
| 200 | 0.6 |
| 250 | 0.6 |
| 300 | 0.7 |

What is claimed is:

1. A zeolite hydrogen-encapsulating material consisting of an A type zeolite having a composition expressed by a typical unit cell: (Cs$_x$ MII$_y$ Na$_z$) (AlO$_2$·SiO$_2$)$_{12}$·(NaAlO$_2$)δ·ωH$_2$O, in which MII represents a divalent metal, $0 \leq \delta \leq 1$, ω represents a positive number and x, y and z which respectively represent in said unit cell the number of cesium, MII and sodium have the following relation:

$$x + 2y + z = 12$$

$$3 \leq x < 12$$

$$0 < y \leq 4.5$$

said divalent cations being substantially present at sites other than 8-member oxygen rings of said zeolite, whereby occulation by the zeolite A of hydrogen is increased and whereby occulation by the zeolite A of hydrogen is effected at a pressure of 100 kg/cm$^2$G at a temperature of 300° C. or less.

2. A zeolite encapsulating material according to claim 1 wherein said M$^{II}$ is a divalent metal selected from the group consisting of magnesium, calcium, strontium, zinc, cadmium, mercury, manganese, iron, cobalt and lead.

3. A method for occluding hydrogen comprising contacting hydrogen, at a pressure of 100 kg/cm$^2$G at a temperature of 300° C. or less, with a zeolite, said zeolite having a composition expressed by a typical unit cell: (Cs$_x$ MIIy Na$_z$)(AlO$_2$.SiO$_2$)$_{12}$·(NaAlO$_2$)δ·ωH$_2$O, in which MII represents a divalent metal, $0 < \delta <$, ω represents a positive number and x, y and z which respectively represent in said unit cell the numbers of cesium, the divalent metal and sodium having the following relation:

$$x + 2y + z = 12$$

$$3 \leq x < 10$$

$$0 < 4 \leq 4.5$$

said divalent cations being substantially present at sites other than 8-member oxygen rings of said zeolite, whereby said hydrogen is encapsulated and occluded by the zeolite A.

* * * * *